US009838421B2

(12) United States Patent
Htay et al.

(10) Patent No.: US 9,838,421 B2
(45) Date of Patent: Dec. 5, 2017

(54) SYSTEMS AND METHODS UTILIZING PEER MEASUREMENTS TO DETECT AND DEFEND AGAINST DISTRIBUTED DENIAL OF SERVICE ATTACKS

(71) Applicants: Aung Htay, Alpharetta, GA (US); Roger Michael Elbaz, Alpharetta, GA (US); Sachin Subhedar, Alpharetta, GA (US); Logan Blyth, Atlanta, GA (US)

(72) Inventors: Aung Htay, Alpharetta, GA (US); Roger Michael Elbaz, Alpharetta, GA (US); Sachin Subhedar, Alpharetta, GA (US); Logan Blyth, Atlanta, GA (US)

(73) Assignee: Ciena Corporation, Haover, MD (US)

( * ) Notice: Subject to any disclaimer, the term of this patent is extended or adjusted under 35 U.S.C. 154(b) by 146 days.

(21) Appl. No.: 14/503,746

(22) Filed: Oct. 1, 2014

(65) Prior Publication Data

US 2016/0099964 A1 Apr. 7, 2016

(51) Int. Cl.
*H04L 29/06* (2006.01)
*H04L 29/12* (2006.01)

(52) U.S. Cl.
CPC ...... *H04L 63/1458* (2013.01); *H04L 63/1425* (2013.01); *H04L 29/12009* (2013.01)

(58) Field of Classification Search
CPC ............... H04L 12/2697; H04L 43/024; H04L 29/12066; H04L 63/1458; H04L 67/02; H04L 63/1441; H04L 29/12009
(Continued)

(56) References Cited

U.S. PATENT DOCUMENTS 8,205,252 B2 6/2012 Simon et al.
8,914,878 B2 * 12/2014 Burns ................. H04L 63/1441
726/13

(Continued)

FOREIGN PATENT DOCUMENTS

CN 103561011 A 2/2014

OTHER PUBLICATIONS

Rossow, Christian, "Amplification Hell: Revisiting Network Protocols for DDoS Abuse," VU University Amsterdam, The Netherlands, Feb. 2014, pp. 1-15.
"Security and data center vendors renew focus on DDoS as attacks multiply; Arbor leads," http://www.infonetics.com/pr/2014/2h13-DDoS-Prevention-Appliances-Market-Highlights, pp. 1-2.
"CloudFlare advanced DDoS protection," https://www.cloudflare.com/ddos, pp. 1.

(Continued)

*Primary Examiner* — Hadi Armouche
*Assistant Examiner* — Bryan Wright
(74) *Attorney, Agent, or Firm* — Clements Bernard Walker PLLC; Christopher L. Bernard; Lawrence A. Baratta, Jr.

(57) ABSTRACT

A method, operated by a Software Defined Networking (SDN) controller associated with an Autonomous System (AS) with one or more peering points, each peering point with an associated router communicatively coupled to the SDN controller, the method for detecting and defending against Distributed Denial of Service (DDoS) attacks, and the method includes receiving data from the one or more peering points; detecting malicious traffic at the one or more peering points; determining a peer quality measurement for the one or more peering points; and communicating the peer quality measurement and other data associated with the malicious traffic to one or more other SDN controllers, associated with Autonomous Systems connected through the one or more peering points, to facilitate convergence of the peer quality measurement back to a nominal level.

12 Claims, 8 Drawing Sheets

(58) Field of Classification Search
USPC .......................................................... 726/23
See application file for complete search history.

(56) References Cited

U.S. PATENT DOCUMENTS

| | | | |
|---|---|---|---|
| 2004/0148520 A1 | 7/2004 | Talpade et al. | |
| 2004/0199793 A1* | 10/2004 | Wilken | H04L 29/12009 726/22 |
| 2005/0220023 A1* | 10/2005 | Kodialam | H04L 41/14 370/235 |
| 2005/0259645 A1* | 11/2005 | Chen | H04L 29/12066 370/389 |
| 2007/0280114 A1* | 12/2007 | Chao | H04L 43/0888 370/235.1 |
| 2009/0013404 A1 | 1/2009 | Chow et al. | |
| 2009/0122697 A1* | 5/2009 | Madhyasha | H04L 12/2697 370/229 |
| 2010/0082513 A1* | 4/2010 | Liu | H04L 63/1458 706/46 |
| 2013/0329734 A1 | 12/2013 | Chesla et al. | |
| 2013/0333029 A1 | 12/2013 | Chesla et al. | |
| 2014/0020102 A1 | 1/2014 | Srinivasan et al. | |
| 2014/0089506 A1 | 3/2014 | Naga et al. | |
| 2014/0325649 A1* | 10/2014 | Zhang | H04L 43/024 726/23 |
| 2015/0149611 A1* | 5/2015 | Lissack | H04L 43/0817 709/224 |
| 2015/0207706 A1* | 7/2015 | Li | H04L 67/02 709/224 |

OTHER PUBLICATIONS

"DDoS Attacks Rise by 240% in 2014, Says Security Watchdog," http://www.ibtimes.co.uk/ddos-attacks-rises-by-240-2014-1442813, pp. 1-5.
Prince, Matthew, "A Brief Primer on Anycast," http://blog.cloudflare.com/a-brief-anycast-primer/, Oct. 2011, , pp. 1-4.
Prince, Matthew, "Robust, Free DNS FTW," http://blog.cloudflare.com/robust-free-dns/, Oct. 2011, pp. 1-3.
Prince, Matthew, "CloudFlare (aka. KickassDNS)," http://blog.cloudflare.com/cloudflare-aka-kickassdns/, Aug. 2012, pp. 1-3.
"IP Traffic Exchange Policy," http://www.level3.com/en/legal/ip-traffic-exchange-policy/, pp. 1-2.
Taylor, Mark, "Observations of an Internet Middleman," http://blog.level3.com/open-internet/observations-internet-middleman/, May 2014, pp. 1-4.
Yaar et al., "Pi: A Path Identification Mechanism to Defend against DDoS Attacks," Carnegie Mellon University, pp. 1-15.
"Alert (TA14-017A) UDP-based Amplification Attacks," https://www.us-cert.gov/ncas/alerts/TA14-017A, Jan. 2014, pp. 1-2.
Prince, Matthew, "Technical Details Behind a 400Gbps NTP Amplification DDoS Attack," http://blog.cloudflare.com/technical-details-behind-a-400gbps-ntp-amplification-ddos-attack/, Feb. 2014, pp. 1-5.
Perlroth et al., "Tech Start-Ups Are Targets of Ransom Cyberattacks," The New York Times, Apr. 3, 2014, pp. 1-4.
Graham-Cumming, John, "Understanding and mitigating NTP-based DDoS attacks," http://blog.cloudflare.com/understanding-and-mitigating-ntp-based-ddos-attacks/, Jan. 2014, pp. 1-6.

* cited by examiner

US 9,838,421 B2

SYSTEMS AND METHODS UTILIZING PEER MEASUREMENTS TO DETECT AND DEFEND AGAINST DISTRIBUTED DENIAL OF SERVICE ATTACKS

FIELD OF THE DISCLOSURE

The present disclosure relates generally to networking systems and methods. More particularly, the present disclosure relates to detecting and defending against Distributed Denial of Service (DDoS) attacks with Software Defined Networking (SDN) and coordination between Autonomous Systems (AS).

BACKGROUND OF THE DISCLOSURE

Denial-of-service (DoS) attacks are on the rise and have evolved into a complex and overwhelming security challenge for organizations large and small. Although DoS attacks are not a recent phenomenon, the methods and resources available to conduct and mask such attacks have dramatically evolved to include Distributed DoS (DDoS) and, more recently, Distributed Reflector DoS (DRDoS) attacks—attacks that simply cannot be addressed by traditional on premise solutions. DDoS is a type of denial of service attack where Trojan-infected machines (often numbering in hundreds to thousands) target a single system. A malicious hacker does this by commanding a fleet of remote machines to send network traffic to a target. Since the attack causes incoming traffic to flood the target system from myriad sources, it effectively makes it impossible to resist simply by blocking a single Internet Protocol (IP) address. More importantly, it is very difficult to distinguish legitimate "good" traffic from the attack traffic. The target becomes so busy dealing with the attackers' requests that it does not have time to respond to other, legitimate user requests. This leads to delays, outages, and in some cases a complete system shutdown.

The frequency of DDoS attacks is increasing and affecting small to medium size businesses with highly damaging results. The second quarter of 2014 alone recorded at least 17 major attacks. In June 2014, DDoS attack on Code Space (web hosting service) made it inoperable and then deleted consumer hosted data as well as backups, forcing them to shut down their business. In addition to causing financial losses, these attacks have become a political tool to 'hacktivists'.

Thus, there is a need for effective countermeasures to detect and defend against DDoS and DRDoS attacks.

BRIEF SUMMARY OF THE DISCLOSURE

In an exemplary embodiment, a method, operated by a Software Defined Networking (SDN) controller associated with an Autonomous System (AS) with one or more peering points, each peering point with an associated router communicatively coupled to the SDN controller, the method for detecting and defending against Distributed Denial of Service (DDoS) attacks, and the method includes receiving data from the one or more peering points; detecting malicious traffic at the one or more peering points; determining a peer quality measurement for the one or more peering points; and communicating the peer quality measurement and other data associated with the malicious traffic to one or more other SDN controllers, associated with Autonomous Systems connected through the one or more peering points, to facilitate convergence of the peer quality measurement back to a nominal level. The data from the one or more peering points can be NetFlow, Internet Protocol Flow Information Export (IPFIX), sFlow, or OpenFlow data. The peer quality measurement can incorporate all types of Bandwidth Amplification Factor (BAF) information in the DDoS attacks. The peer quality measurement can incorporate all combinations to a victim or victims across Internet Protocol (IP) prefixes. The other data associated with the malicious traffic can include source Internet Protocol (IP) addresses, destination IP addresses, protocol, and port number, allowing the one or more other SDN controllers to similarly track down problems with peering points associated with the Autonomous Systems and provide feedback via the peer quality measurement and data associated with the peering points associated with the Autonomous Systems. The peer quality measurement can be a feedback loop with negative and/or positive feedback between the Autonomous System and the Autonomous Systems connected through the one or more peering points. The nominal level can be based on historical monitoring through the SDN controller.

In another exemplary embodiment, a Software Defined Networking (SDN) controller, associated with an Autonomous System with one or more peering points, each peering point with an associated router communicatively coupled to the SDN controller, the SDN controller configured to detect and defend against Distributed Denial of Service (DDoS) attacks, the SDN controller includes a network interface communicatively coupled to routers associated with the one or more peering points; a processor communicatively coupled to the network interface; and memory storing instructions that, when executed, cause the processor to receive data from the routers associated with the one or more peering points, detect malicious traffic at the routers associated with the one or more peering points, determine a peer quality measurement for the routers associated with the one or more peering points, and communicate the peer quality measurement and other data associated with the malicious traffic to one or more other SDN controllers, associated with Autonomous Systems connected through the routers associated with the one or more peering points, to facilitate convergence of the peer quality measurement back to a nominal level. The data from the routers associated with the one or more peering points can be NetFlow, Internet Protocol Flow Information Export (IPFIX), sFlow, or OpenFlow data. The peer quality measurement can incorporate all types of Bandwidth Amplification Factor (BAF) information in the DDoS attacks. The peer quality measurement can incorporate all combinations to a victim or victims across Internet Protocol (IP) prefixes. The other data associated with the malicious traffic includes source Internet Protocol (IP) addresses, destination IP addresses, protocol, and port number, allowing the one or more other SDN controllers to similarly track down problems with peering points associated with the Autonomous Systems and provide feedback via the peer quality measurement and data associated with the peering points associated with the Autonomous Systems. The peer quality measurement can be a feedback loop with negative and/or positive feedback between the Autonomous System and the Autonomous Systems connected through the one or more peering points. The nominal level can be based on historical monitoring through the SDN controller.

In a further exemplary embodiment, an Autonomous System (AS) configured to detect and defend against Distributed Denial of Service (DDoS) attacks includes one or more routers each associated with one or more peering points with other Autonomous Systems; and a Software Defined Networking (SDN) controller communicatively coupled to the one or more routers, the SDN controller configured to receive data from the one or more routers associated with the one or more peering points, detect malicious traffic at the one or more routers, determine a peer quality measurement for the one or more routers associated with the one or more peering point, and communicate the peer quality measurement and other data associated with the malicious traffic to one or more other SDN controllers, associated with the other Autonomous Systems connected through the one or more routers, to facilitate convergence of the peer quality measurement back to a nominal level. The data from the one or more routers can be NetFlow, Internet Protocol Flow Information Export (IPFIX), sFlow, or Open-Flow data. The peer quality measurement can incorporate all types of Bandwidth Amplification Factor (BAF) information in the DDoS attacks. The peer quality measurement can incorporate all combinations to a victim or victims across Internet Protocol (IP) prefixes in the Autonomous System. The other data associated with the malicious traffic can include source Internet Protocol (IP) addresses, destination IP addresses, protocol, and port number, allowing the one or more other SDN controllers to similarly track down problems with peering points associated with the other Autonomous Systems and provide feedback via the peer quality measurement and data associated with the peering points associated with the other Autonomous Systems. The peer quality measurement can be a feedback loop with negative and/or positive feedback between the Autonomous System and the other Autonomous Systems connected through the one or more peering points.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
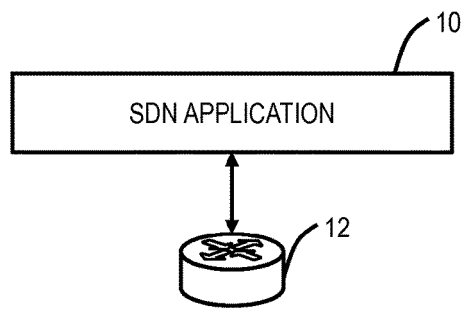
FIG. 1 is a diagram of an SDN application communicatively coupled to a router.

In various exemplary embodiments, systems and methods are described to detect and defend against DDoS or DRDoS attacks. The systems and methods relate to an SDN application, an SDN controller, and network elements to perform distributed Autonomous Systems (AS) Peer Quality (PQ) Optimization to detect and combat DDoS attacks. The SDN application can use the IP prefix advertised by the AS and the NetFlow/Internet Protocol Flow Information Export (IPFIX) data from the network elements to calculate the traffic for IP. The SDN application can reside in the AS such as, but not limited to, web content management systems (like Clickability etc.), subsequent content delivery networks (CDNs) and Tier-1/2/3 Internet Service Providers (ISPs). Each instance of the SDN application queries the average utilization from the AS to calculate 'Peer Quality' normalized to healthy traffic. When malicious traffic starts to flood the network, it results in a 'Peer Quality' deviation which is then propagated across the network of peer AS. Each system can, in turn, pinpoint the originating IP(s) and port(s) of malicious traffic and notify a peer AS, if necessary. At each point, 'Peer Quality' is recalculated to evaluate impact of detecting and mitigating the malicious traffic. If the 'Peer Quality' has not returned to the desired level after an AS notifies its peer, the process is repeated until 'Peer Quality' has returned to the desired level. This distributed defense approach is an effective strategy to identify offending traffic sources and bring 'Peer Quality' to acceptable levels. By focusing on the peering points between AS and distributing the calculation of 'Peer Quality' to the Autonomous Systems, the systems and methods have the necessary scale to protect the Internet.

The systems and methods described herein operate with an Autonomous System, which is a collection of connected IP routing prefixes under the control of one or more network operators that presents a common, clearly defined routing policy to the Internet. A definition of the AS is provided in RFC 1930, "Guidelines for creation, selection, and registration of an Autonomous System (AS), the contents of which are incorporated by reference herein. A strength of the systems and methods lies in the use of Peer Quality as the detection of malicious traffic, the distributed and iterative nature of Peer Quality calculation, and the mutually compatible Peer Quality across the Autonomous Systems covering the whole Internet. Each Autonomous System (AS) imposes a negative externality, caused by malicious traffic originating from itself, on its peers. The Peer Quality measurement between two peers is a form of negative feedback, whereby the systems and methods try to internalize the AS negative externalities.

The state-of-the-art technology for mitigating DDoS attacks is an Authoritative Domain Name System (DNS) network that uses an anycast routing structure between data centers that are globally distributed. This allows for the mitigation of DDoS attacks by routing traffic to the geographically nearest data center instead of all the traffic converging on a single data center. A DDoS attack may be thought of a "many to one" traffic pattern, with a state-of-the-art anycast network the traffic pattern becomes "many to many" with the geographically nearest data center handling all the traffic for its geographic region.

For a Transmission Control Protocol (TCP) synchronize (SYN) DoS/DDoS "Flood" attack, an attacker spoofs fake IP address "SYN" to a server, and the server replies "SYN/ACK" but no response is ever gained. Multiple fake-IP use will result in a congestion of "half-open lines," and the server will not accept legitimate traffic. For a TCP SYN DRDoS "Flood" attack, an attacking machine can send a SYN packet to any of the publicly available servers, mail, web or any other, with a spoofed source IP—in this case, the IP of the victim. Now the recipient of the SYN will generate a SYN/ACK and send it to the victim. This way the server is used by the attacker to reflect packets to the target network, rather than sending packets directly to the target network as is the case in a DDoS.

UDP, by design, is a connection-less protocol that does not validate source IP addresses. Unless the application-layer protocol uses countermeasures such as session initiation, it is very easy to forge the IP packet datagram to include an arbitrary source IP address. When many UDP packets have their source IP address forged to a single address, the server responds to that victim, creating a Denial of Service (DoS) Attack. Recently, certain UDP protocols have been found to have particular responses to certain commands that are much larger than the initial request. Where before, attackers were limited linearly by the number of packets directly sent to the target to conduct a DoS attack, now a single packet can generate tens or hundreds of times the bandwidth in its response. This is called an amplification attack.

Volumetric attacks are intended to exhaust some resource through the sheer weight of the attack. This type of attack has been seen with increasing frequency lately through User Datagram Protocol (UDP)-based amplification attacks using protocols, like DNS, Simple Network Management Protocol (SNMP), or Network Time Protocol (NTP). The only way to withstand an attack like this is to have more available network capacity than the sum of all of the attacking nodes or to filter the attack traffic before it reaches the network. Dealing with volumetric attacks is a game of numbers. Whoever has more capacity wins. DDoS mitigation service providers are able to absorb the attack, filter out the malicious traffic, and forward the legitimate traffic onto the enterprise customer for normal processing.

In the majority of DDoS attacks, attackers use requests with high BAF (Bandwidth Amplification Factor) to flood network traffic. BAF is defined as the bandwidth multiplier in terms of number of UDP payload bytes that an amplifier sends to answer a request, compared to the number of UDP payload bytes of the request.

$$BAF = \frac{\text{Length}(UDP \text{ payload}) \text{ amplifier to victim}}{\text{Length}(UDP \text{ payload}) \text{ attacker to amplifier}}$$

Legitimate BAF requests are not ubiquitous and occur infrequently during normal networking operations. The following table illustrates example BAFs for some commonly used protocols:

| Protocol | BAF all | BAF 50% | 10% | BAF all | Scenario |
|---|---|---|---|---|---|
| SNMP v2 | 6.3 | 8.6 | 11.3 | 1 | GetBulk Request |
| NTP | 556.9 | 1083.2 | 4670 | 3.84 | Request client statistics |
| DNSNS | 54.6 | 76.7 | 98.3 | 2.08 | ANY lookup at author. NS |
| DNSOR | 28.7 | 41.2 | 64.1 | 1.32 | ANY lookup at open resolver |
| NetBios | 3.8 | 4.5 | 4.9 | 1 | Name resolution |
| SSDP | 30.8 | 40.4 | 75.9 | 9.92 | SEARCH request |
| CharGen | 358.8 | n/a | n/a | 1 | Character generation request |
| QOTD | 140.3 | n/a | n/a | 1 | Quote request |
| BitTorrent | 3.8 | 5.3 | 10.3 | 1.58 | File search |
| Kad | 16.3 | 21.5 | 22.7 | 1 | Peer list exchange |
| Quake 3 | 63.9 | 74.9 | 82.8 | 1.01 | Server info exchange |
| Steam | 5.5 | 6.9 | 14.7 | 1.12 | Server info exchange |
| ZAv2 | 36 | 36.6 | 41.1 | 1.02 | Peer list and cmd exchange |
| Sality | 37.3 | 37.9 | 38.4 | 1 | URL list exchange |
| Gameover | 45.4 | 45.9 | 46.2 | 5.39 | Peer and proxy exchange | www.internetsociety.org/sites/default/files/01__5.pdf

Thus, requests with high BAF cause substantial processing overhead on target systems and generate a lot of traffic. The most critical problem when a DDoS attack happens is to be able to identify services that are abused by the amplifiers and differentiate them from legitimate services that include good traffic. On sifting the 'noisy' traffic it is then required to proactively prevent these requests from further processing.

For UDP amplification, attackers use amplification to increase the traffic volume in an attack. In the DNS attacks, the attacker uses an extension to the DNS protocol (EDNS0) that enables large DNS messages. The attacker composes a DNS request message of approximately 60 bytes to trigger the delivery of a response message of approximately 4000 bytes to the target. The resulting amplification factor, approximately 70:1, significantly increases the volume of traffic the target receives, accelerating the rate at which the target's resources will be depleted. For NTP, a command:

ntpdc -c monlist 1xx.xxx.xxx.xx9 sends the MON_GETLIST command to the server at 1xx.xxx.xxx.xx9. The request packet is 234 bytes long. The response is split across 10 packets totaling 4,460 bytes. That's an amplification factor of 19x and because the response is sent in many packets an attack using this would consume a large amount of bandwidth and have a high packet rate. In an exemplary operation completed, a particular NTP server only had 55 addresses. Each response packet contains 6 addresses (with one short packet at the end), so a busy server that responded with the maximum 600 addresses would send 100 packets for a total of over 48 k in response to just 234 bytes. That's an amplification factor of 206x.

Referring to FIG. 1, in an exemplary embodiment, a diagram illustrates an SDN application 10 communicatively coupled to a router 12. In various exemplary embodiments, the systems and methods aim to identify the abusing amplifiers, by monitoring spoofed traffic with high BAF and prohibiting excessive requests from reaching a target system. For example, NetFlow/IPFIX data are sent to the SDN application 10 by the router 12. The SDN application 10 uses the IP Prefix advertised by an Autonomous System (AS) and NetFlow/IPFIX data to calculate the traffic for the IP. For example, the following information is available, to the SDN application 10, from NetFlow/IPFIX: Interface, Source IP, Source Port, Destination IP, Destination Port, Protocol, Bytes, and Time. The SDN application 10 can use OpenFlow, sFlow, sFlow-RT, or the like.

SDN Controller

Figure 2:
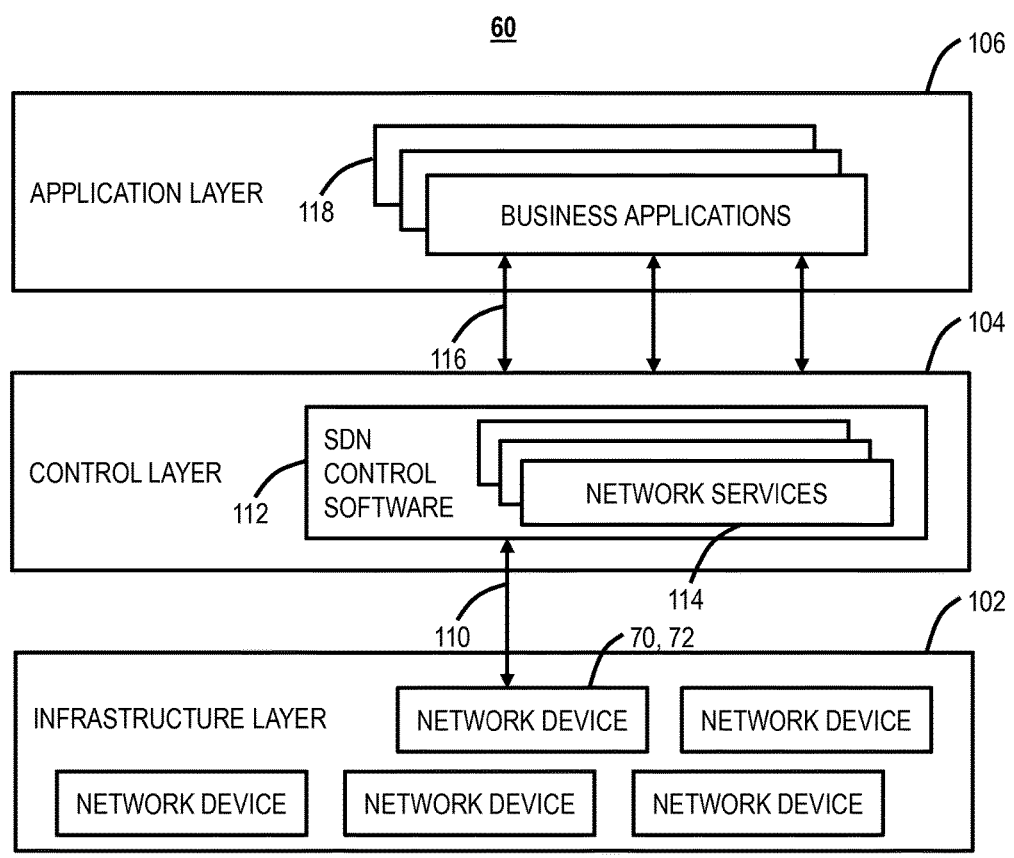
FIG. 2 is a block diagram of functional components of an SDN controller.
Figure 3:
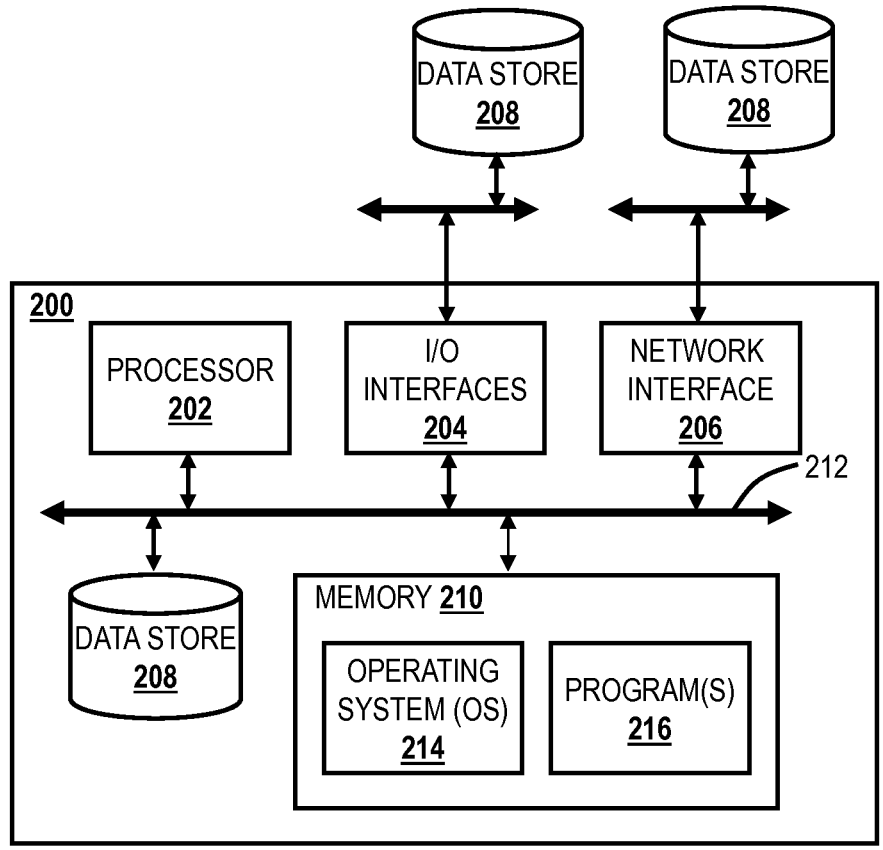
FIG. 3 is a block diagram of a server which may be used to realize the SDN controller of FIG. 2.

Referring to FIG. 2, in an exemplary embodiment, a block diagram illustrates functional components of an SDN controller 60. The SDN controller 60 can be a server or the like, such as illustrated in FIG. 3 and the functional components can be implemented in software executed on the server. The SDN controller 60 includes an infrastructure layer 102, a control layer 104, and an application layer 106. The infrastructure layer 102 is communicatively coupled to network devices such as the switches 70, 72 via a control plane interface 110 such as OpenFlow. The infrastructure layer 102 allows communication between the SDN controller 60 and the network devices. The control layer 104 includes SDN control software 112 with a plurality of network services 114. The control layer 104 provides SDN functionality to manage network services through abstraction of lower level functionality. The application layer 106 communicates to the control layer 104 through various Application Programming Interfaces (APIs) 116. The application layer 106 provides end user connectivity to the SDN such as software modules and/or functions responsible for creating desired path and flow connections on the physical network through various business applications 118. In an exemplary embodiment, the systems and methods can be implemented through the SDN application 10 as one of the business applications 118 on the SDN controller 60.

Exemplary Server Architecture

Referring to FIG. 3, in an exemplary embodiment, a block diagram illustrates a server 200 which may be used to realize the SDN controller 60. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications between the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touch pad, and/or a mouse. System output may be provided via a display device and a printer (not shown). I/O interfaces 204 may include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered list of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

UDP Amplification Attacks

A UDP-based amplification attack is described by the Alert (TA14-017A) available online at www.us-cert.gov/ncas/alerts/TA14-017A. The following table shows that the Bandwidth Amplification Factor (BAF) can range from 3.8 to 556.9 depending on the protocol being abused.

| Protocol | Bandwidth Amplification Factor | Vulnerable Command |
|---|---|---|
| DNS | 28 to 54 | see: TA13-088A [1] |
| NTP | 556.9 | see: TA14-013A [2] |
| SNMPv2 | 6.3 | GetBulk request |
| NetBIOS | 3.8 | Name resolution |
| SSDP | 30.8 | SEARCH request |
| CharGEN | 358.8 | Character generation request |
| QOTD | 140.3 | Quote request |
| BitTorrent | 3.8 | File search |
| Kad | 16.3 | Peer list exchange |
| Quake Network Protocol | 63.9 | Server info exchange |
| Steam Protocol | 5.5 | Server info exchange |

In an exemplary embodiment, an NTP 'monlist' command-based BAF is described. Here is an example: a 234 byte request incurs a 4460 byte response, resulting in a BAF of 19 (4460±234=19.06). See, for example, blog.cloudflare.com/understanding-and-mitigating-ntp-based-ddos-attacks. Also, for example, CloudFlare has identified problematic NTP servers, in particular attach described at blog.cloudflare.com/technical-details-behind-a-400 gbps-ntp-amplification-ddos-attack, as follows:

| ASN | Network | Count |
|---|---|---|
| 9808 | CMNET-GD Guangdong Mobile Communication Co. Ltd. | 136 |
| 4134 | CHINANET-BACKBONE No. 31, Jin-rong Street | 116 |
| 16276 | OVH Systems | 114 |
| 4837 | CHINA169-BACKBONE CNCGROUP China169 Backbone | 81 |
| 3320 | DTAG Deutsche Telekom AG | 69 |
| 39116 | TELEHOUSE Inter. Corp. of Europe Ltd | 61 |
| 10796 | SCRR-10796-Time Warner Cable Internet LLC | 53 |
| 6830 | LGI-UPC Liberty Global Operations B.V. | 48 |
| 6663 | TTI-NET Euroweb Romania SA | 46 |
| 9198 | KAZTELECOM-AS JSC Kazakhtelecom | 45 |
| 2497 | IIJ Internet Initiative Japan Inc. | 39 |
| 3269 | ASN-IBSNAZ Telecom Italia. S.p.a. | 39 |
| 9371 | SAKURA-C SAKURA Internet Inc. | 39 |
| 12322 | PROXAD Free SAS | 37 |
| 20057 | AT&T Wireless Service | 37 |
| 30811 | EPiServer AB | 36 |
| 137 | ASGARR GARR Italian academic and research network | 34 |
| 209 | ASN-QWEST-US NOVARTIS-DMZ-US | 33 |
| 6315 | XMISSION - XMission, L.C. | 33 |
| 52967 | NT Brasil Tecnologia Ltda. ME | 32 |
| 4713 | OCN NTT Communications Corporation | 31 |
| 56041 | CMNET-ZHEJIANG-AP China Mobile communications corporation | 31 |
| 1659 | ERX-TANET-ASN1 Taiwan Academic Network (TANet) Information C | 30 |
| 4538 | ERX-CERNET-BKB China Education and Research Network Center | 30 |

In the above table, the acronym ASN is used to describe an Autonomous System Number. Again, in short, an Autonomous System (AS) is defined as "a collection of connected Internet Protocol (IP) routing prefixes under the control of one or more network operators that presents a common, clearly defined routing policy to the Internet."

Exemplary NTP Attack

Figure 4:
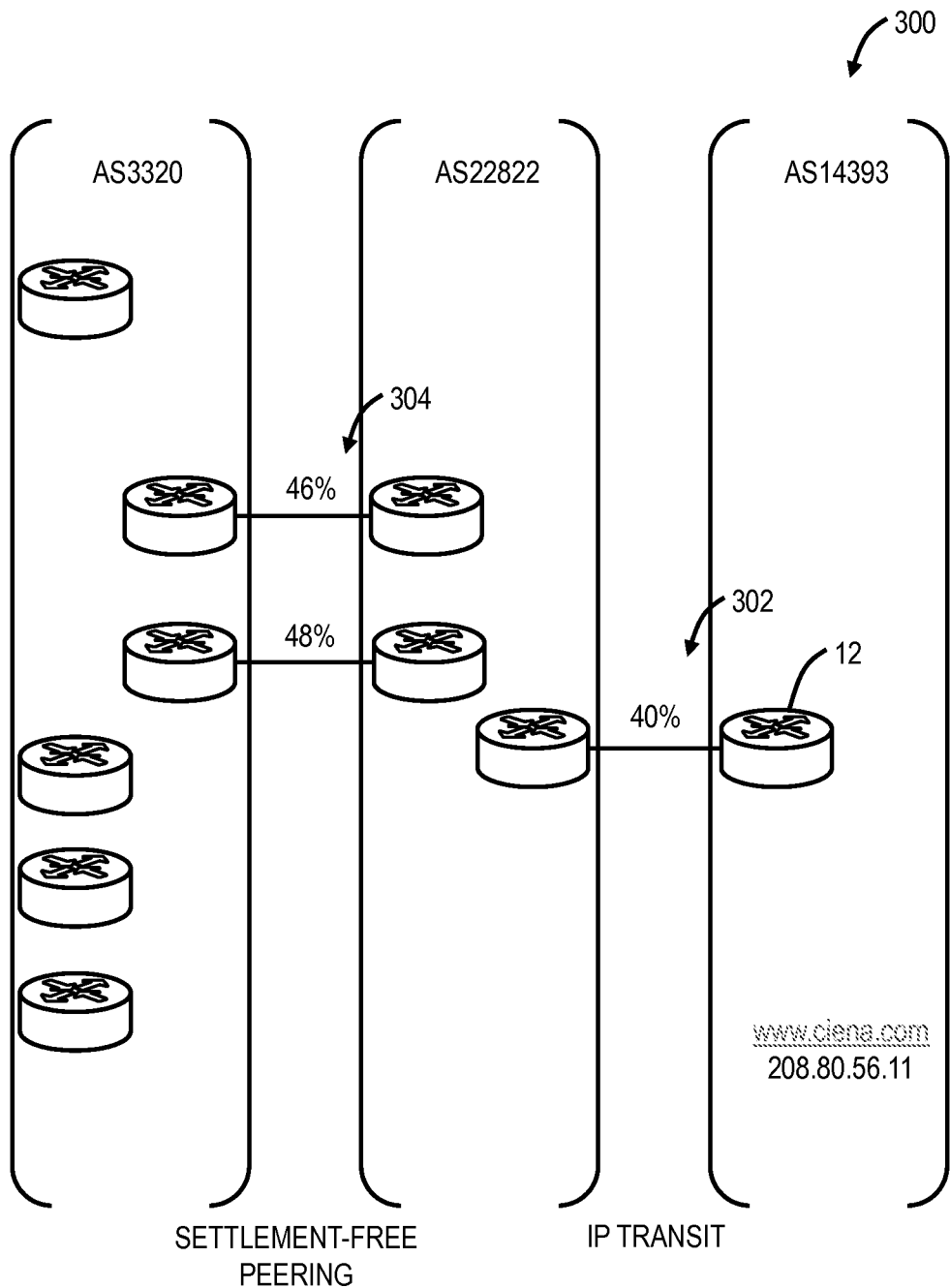
FIGS. 4, 5, 6, 7, and 8 are network diagrams of various, interconnected autonomous systems with various routers therein illustrating an exemplary NTP BA attack with SDN controllers configured to monitor, detect, and defend the attack.

Referring to FIG. 4, in an exemplary embodiment, a network diagram illustrates various, interconnected autonomous systems 300 with various routers 12 therein. The following exemplary implementation is a 'WHAT-IF' scenario concerning the domain name www.ciena.com. The scenario is based on a historical NTP attack that was deflected by CloudFlare. The autonomous systems 300 can include Clickability (AS14393), LimeLight Networks (AS22822), and Deutsche Telecom (AS3320). A domain name www.ciena.com is hosted by Clickability (AS14393). Clickability (AS14393) has a high-speed IP transit peering (paid peering) with LimeLight Networks (AS22822). LimeLight Networks (AS22822) has Settlement-Free peering (non-paid peering) with Deutsche Telecom (AS3320).

In this exemplary embodiment, the high-speed IP transit between Limelight Networks and Clickability is 10G at a peering point 302. The average utilization is 40%. The average utilization will be important for setting baseline average traffic later on, in this case the average traffic is (10G×40%=4G). As described herein, 'Peer Quality' is the sum of average traffic and malicious traffic, divided by the average traffic. When no malicious traffic exists, the 'Peer Quality' between the LimeLight Networks AS and Clickability AS is (4G+0G)/4G=1. In this case, there is no need to actually calculate the 'Peer Quality,' because there is no malicious traffic detected. This also addresses normal variability concerns in traffic patterns.

LimeLight Networks (AS22822) has settlement-free peering with Deutsche Telekom (AS3320). The peering between them is at one or more (two shown through routers 12) cities around the world. The border routers are connected using one or more 10G ports. For the exemplary implementation, one 10G port is used at peering points 304. The average utilization is 44% and 46% at the two peering points 304 as shown. The 'Peer Quality' between Deutsche Telekom and Limelight Networks can be viewed as individual peering points or as an aggregate peering point as follows:

Viewed as Individual peering points $$\frac{4.4G + 0G}{4.4G}$$

$$\frac{4.6G + 0G}{4.6G}$$

Viewed as an Aggregate peering point $$\frac{4.4G + 0G + 4.6G + 0G}{4.4G + 4.6G}$$

Figure 5:
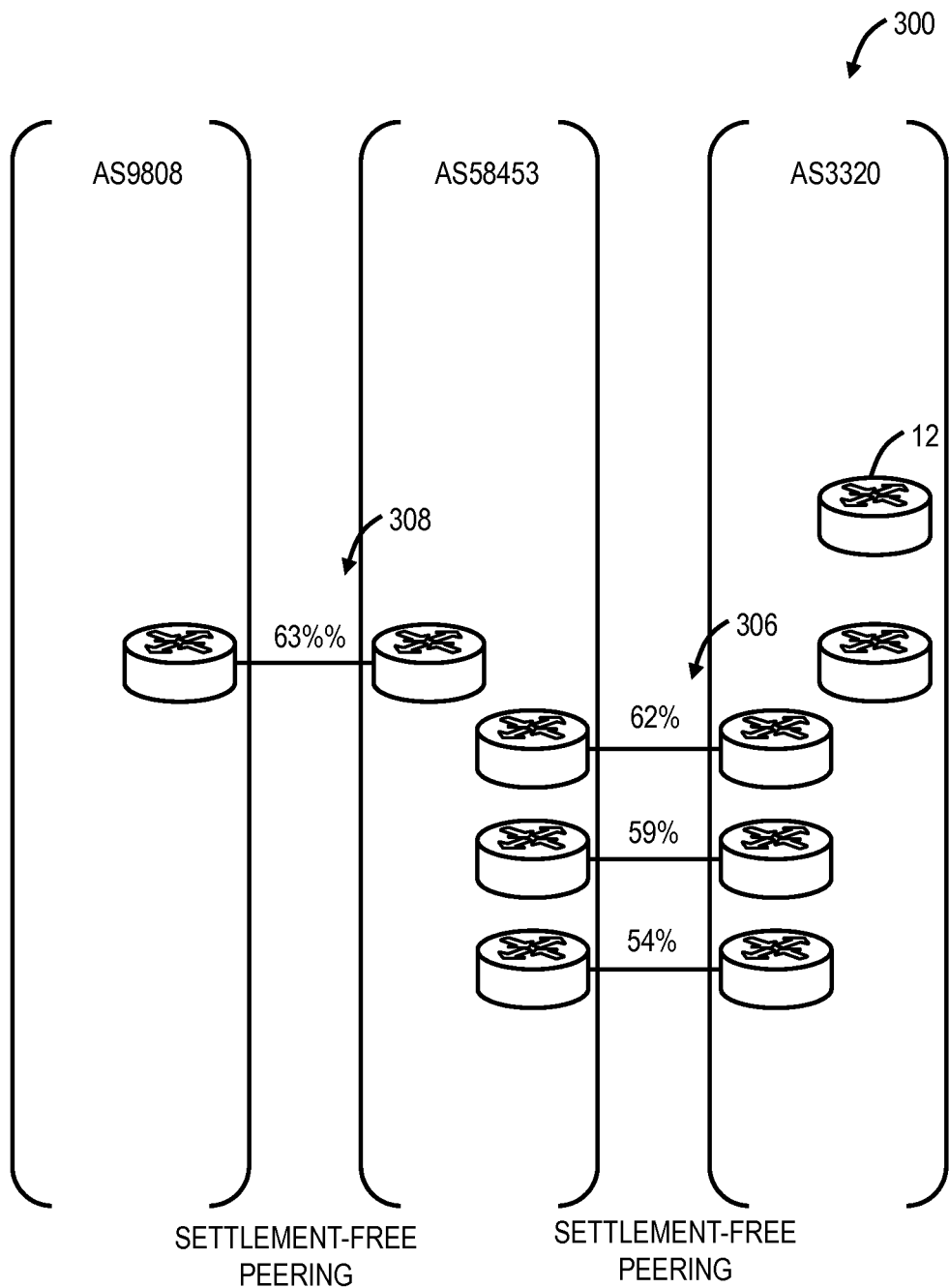

Referring to FIGS. 5, 6, 7, and 8, in an exemplary embodiment, a network diagram illustrates various, interconnected autonomous systems 300 with various routers 12 therein, continuing from the various, interconnected autonomous systems 300 in FIG. 4. As shown in FIG. 5, similar peering arrangements exist between Deutsche Telekom (AS3320)-China Mobile (AS58453) and China Mobile (AS58453)-Guangdong Mobile (AS9808). The average utilizations are shown in FIG. 5 for peering points 306, 308.

Figure 6:
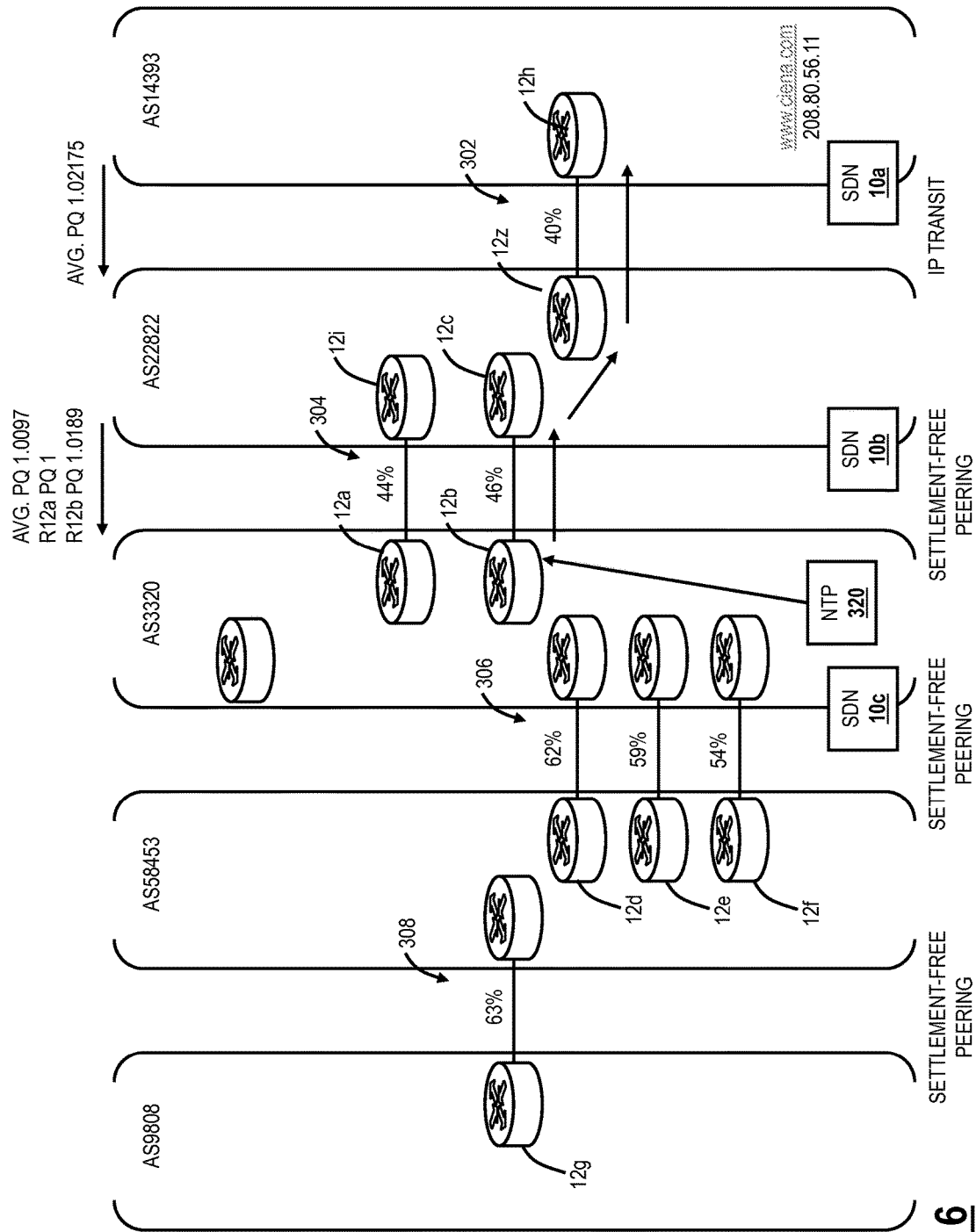

From historical data, during the last NTP attack, it was observed that an infected NTP server sent 87 Mbps of Bandwidth-Amplified (BA) traffic to the attacked victim. In an exemplary implementation, as shown in FIG. 6, consider Clickability, Inc. (AS14393). The SDN application 10a detects the malicious traffic from NetFlow/IPFIX data from the border router 12h at AS14393. Assume that an NTP server 320 in Deutsche Telekom (AS3320) sends 87 Mbps BA traffic. The malicious traffic is detected by the tuple Source IP 6xx.xxx.xx9 (obfuscated in the disclosure document to protect privacy), Destination IP 208.80.56.11 (domain name—www.ciena.com), Source Port 123 and UDP protocol.

First, the Peer Quality measured by the SDN application 10a at AS14393 is $$\frac{4.0G + 0.087G}{4.G} = 1.02175 \text{ at } AS14393.$$

Second, the SDN application 10a at AS14393 sends the following information to the SDN application 10b at the LimeLight Networks (AS22822):

Aggregate Peer Quality measured from AS14393 is 1.02175;

Source IP 6xx.xxx.xx9, Destination IP 208.80.56.11, Source port 123 and UDP protocol; and Peer Quality for Interface 7 @ router 12z is 1.02175.

Third, the SDN application 10b at AS22822 starts by looking at the NetFlow/IPFIX data sent by its border routers 12i and 12c facing the Deutsche Telekom routers 12a and 12b respectively. The Peer Quality measured by the SDN application 10b for the router 12b is $$\frac{4.6G + 0.087G}{4.6G} = 1.0189.$$

The Peer Quality measured by the SDN application 10b for the router 12a is 1. The aggregate Peer Quality measured by the SDN application 10b is $$\frac{9G + 0.087G}{9G} = 1.0097$$

Fourth, the SDN application 10b identifies a border router 12c facing Deutsche Telekom (AS3320) router 12b as the source of BA Traffic. Finally, the SDN application 10b sends the following information to the SDN application 10c located at Deutsche Telekom (AS3320):

Aggregate Peer Quality measured from AS22822 is 1.0097.

Source IP 6xx.xxx.xx9, Destination IP 208.80.56.11, Source port 123 and UDP protocol.

Peer Quality for Interface 1 @ the router 12b is 1.0189.

Peer Quality for the router 12a is 1.

Figure 7:
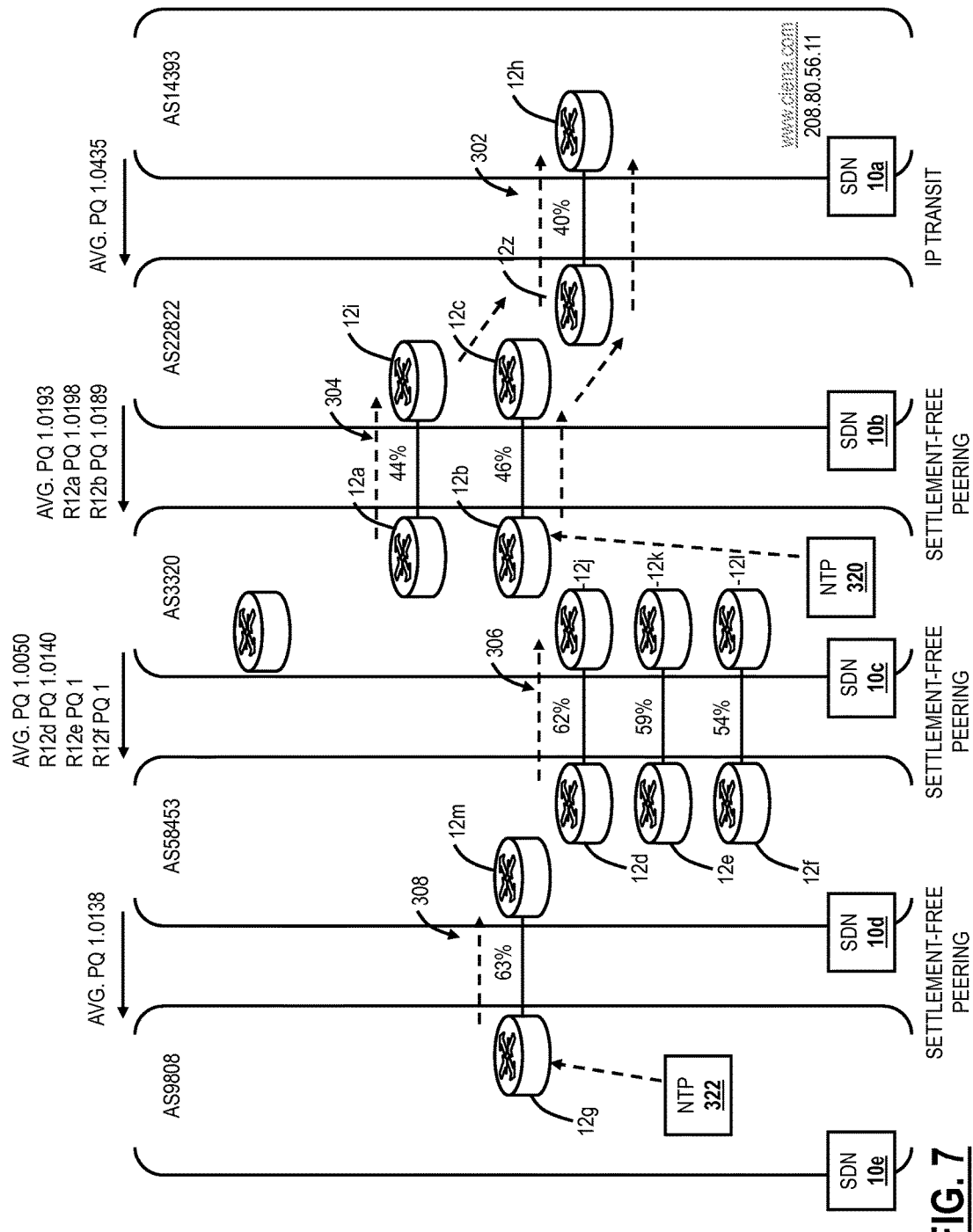

Now, in FIG. 7, assume that the attacker activates another NTP server 322 (1xx.xxx.xx7) at Guangdong Mobile (AS9808). The SDN application 10a receiving NetFlow/IPFIX data from the border router 12h at AS14393, now detects 174 Mbps of BA traffic. First, the Peer Quality measured by the SDN application 10a is now $$\frac{4.0G + 0.174G}{4.0G} = 1.0435 \text{ at the } AS14393.$$

Second, the SDN application 10a sends the following information to the SDN application 10b located at LimeLight Networks (AS22822):

Aggregate Peer Quality measured from AS14393 is 1.0435.

Source IP [6xx.xxx.xx9, 1xx.xxx.xx7], Destination IP 208.80.56.11, Source port 123 and UDP protocol.

Peer Quality for Interface 7 @ the router 12z is 1.0435.

Third, the SDN application 10b at AS22822 continues looking at the NetFlow/IPFIX data sent by the border routers facing its peers. It identifies two border routers 12i, 12c facing the Deutsche Telekom (AS3320) routers 12a, 12b respectively as the source of BA traffic. The Peer Quality measured by the SDN application 10b for the router 12b is $$\frac{4.6G + 0.087G}{4.6G} = 1.0189.$$

The Peer Quality measured by the SDN application 10b for the router 12a is $$\frac{4.4G + 0.087G}{4.4G} 1.0198.$$

The aggregate Peer Quality measured by the SDN application 10b is $$\frac{9G + 0.174G}{9G} = 1.0193.$$

Fourth, the SDN application 10b sends the following information to the SDN application 10c located at Deutsche Telekom (AS3320):

Aggregate Peer Quality measured from AS22822 is 1.0193.

Source IP [6xx.xxx.xx9, 1xx.xxx.xx7], Destination IP 208.80.56.11, Source port 123 and UDP protocol.

Peer Quality for Interface 1 @ router 12b is 1.0189.

Peer Quality for Interface 8 @ router 12a is 1.0198.

Fifth, the SDN application 10c at AS3320 starts looking at the NetFlow/IPFIX data sent by the border routers facing its peers. It identifies a border router 12j facing China Mobile (AS58453) router 12d as the source of BA traffic. The Peer Quality measured by the SDN application 10c for the router 12d is $$\frac{6.2G + 0.087G}{6.2G} = 1.0140.$$

The aggregate Peer Quality measured by the SDN application 10c is $$\frac{17.5G + 0.087G}{17.5G} = 1.0050.$$

Sixth, the SDN application 10c sends the following information to the SDN application 10d located at China Mobile (AS58453):

Aggregate Peer Quality measured from AS3320 is 1.0050.

Source IP [6xx.xxx.xx9, 1xx.xxx.xx7], Destination IP 208.80.56.11, Source port 123 and UDP protocol.

Peer Quality for Interface 9 @ router 12d is 1.0140.

Peer Quality for Interface 8 @ router 12e is 1.

Peer Quality for Interface 2 @ router 12f is 1.

Seventh, the SDN application 10d at AS58453 starts look at the NetFlow/IPFIX data sent by the border routers facing its peers. It identifies a border 12m facing Gaungdong Mobile (AS9805) router 12g as the source of BA traffic. The Peer Quality measured by the SDN application 10d for the router 12g is $$\frac{6.3G + 0.087G}{6.3G} = 1.0138.$$

Finally, the SDN application 10*d* sends the following information to the SDN application 10*e* located at Guangdong Mobile (AS9805):

Aggregate Peer Quality measured from AS58453 is 1.0138.

Source IP [6xx.xxx.xx9, 1xx.xxx.xx7], Destination IP 208.80.56.11, Source port 123 and UDP protocol.

Peer Quality for Interface 1 @ router 12*g* is 1.0138.

Figure 8:
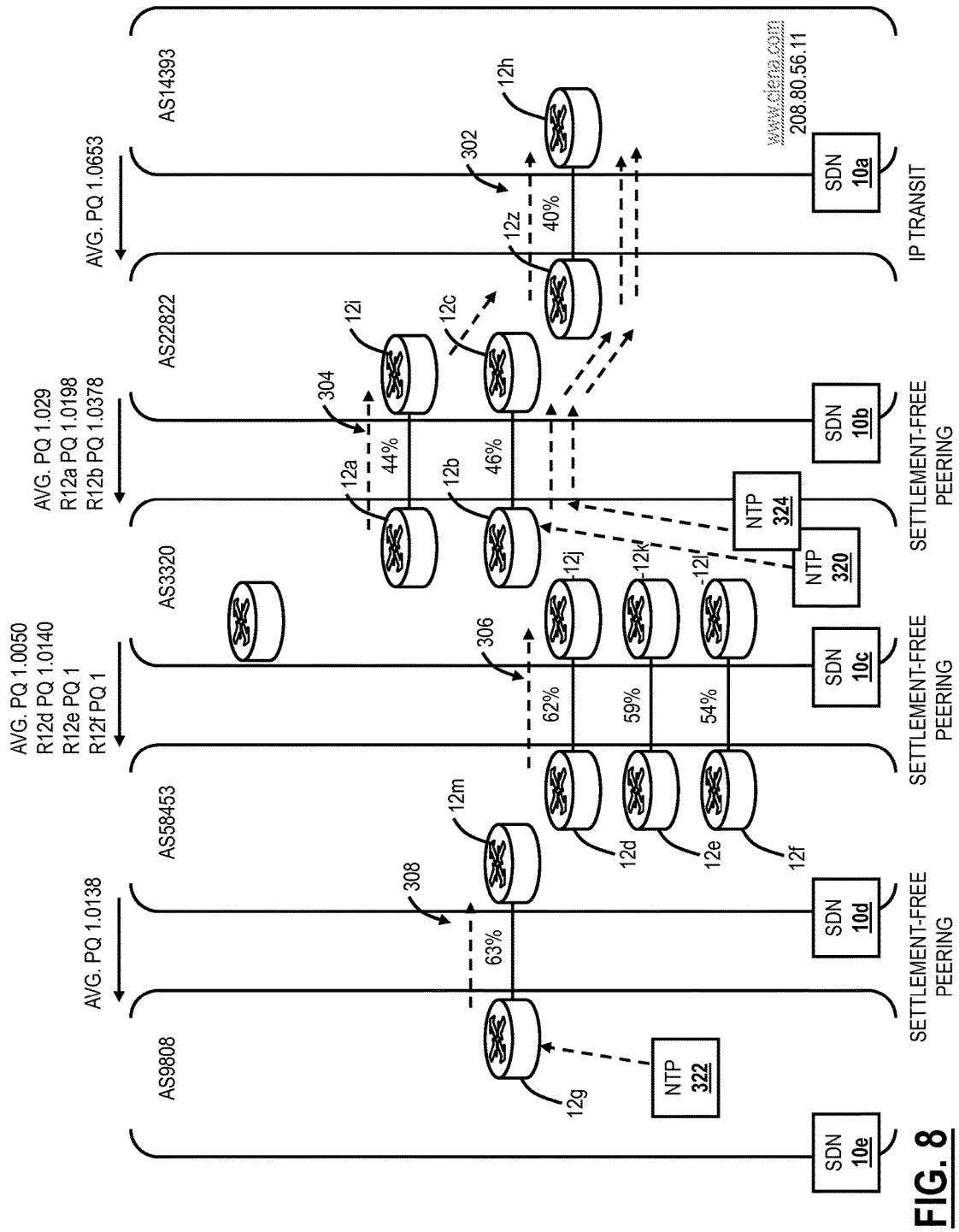

Now, in FIG. 8, another NTP server 324 (NTP 2 8xx.xxx.xx1) in the Deutsche Telekom (AS3320) joins the attack. The SDN application 10*a* receiving NetFlow/IPFIX data from the border router 12*h* at AS14393, now detects 261 Mbps of BA traffic. First, the Peer Quality measured by the SDN application 10*a* is now $$\frac{4.0G + 0.261G}{4.0G} = 1.0653 \text{ at the } AS14393.$$

Second, the SDN application 10*a* sends the following information to the SDN application 10*b* located at LimeLight Networks (AS22822):

Aggregate Peer Quality measured from AS14393 is 1.0653.

Source IP [6xx.xxx.xx9, 1xx.xxx.xx7, 8xx.xxx.xx1], Destination IP 208.80.56.11, Source port 123 and UDP protocol.

Peer Quality for Interface 7 @ router 12*z* is 1.0653.

Third, the SDN application 10*b* at AS22822 continues looking at the NetFlow/IPFIX data sent by the border routers facing its peers. It identifies two border routers 12*i*, 12*c* facing the Deutsche Telekom (AS3320) routers 12*a* and 12*b* respectively as the source of BA traffic. The Peer Quality measured by the SDN-App for router 12*b* is $$\frac{4.6G + 0.174G}{4.6G} = 1.0378.$$

The Peer Quality measured by the SDN application 10*b* for router 12*a* is $$\frac{4.4G + 0.087G}{4.4G} 1.0198.$$

The aggregate Peer Quality measured by the SDN application 10*b* is $$\frac{9G + 0.261G}{9G} = 1.029.$$

Fourth, the SDN application 10*b* sends the following information to the SDN application 10*c* located at Deutsche Telekom (AS3320):

Aggregate Peer Quality measured from AS22822 is 1.029.

Source IP [6xx.xxx.xx9, 1xx.xxx.xx7, 8xx.xxx.xx1], Destination IP 208.80.56.11, Source port 123 and UDP protocol.

Peer Quality for Interface 1 @ router 12*a* is 1.0378.

Peer Quality for Interface 8 @ router 12*b* is 1.0198.

Finally, as more NTP servers attack, the Peer Quality at each of the settlement-free and IP-transit peering points is measured. As can be seen, the Peer Quality of the LimeLight Networks as measured by the Clickability, Inc. will quickly cross an acceptable threshold. At that point, the SDN application 10*b* at the LimeLight Networks will configure router 12*z* to filter out Destination IP address 208.80.56.11, Source UDP port 123. Independently at each Autonomous System, the SDN applications 10 can configure the responsible routers 12 to filter out the BA traffic whenever the acceptable threshold for that AS is crossed.

Figure 9:
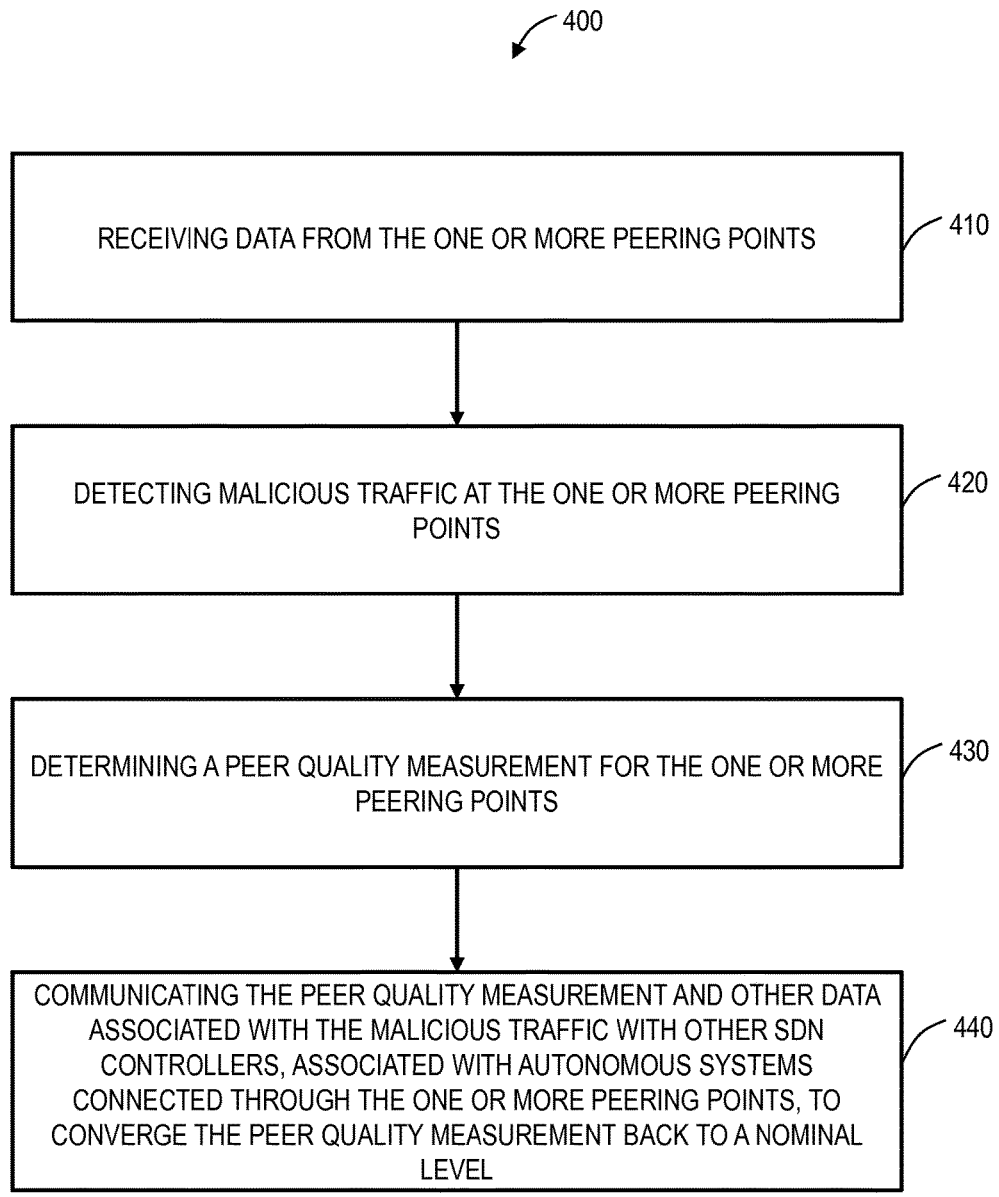
FIG. 9 is a flow chart of an SDN process for detecting and defending against DDoS attacks.

Referring to FIG. 9, in an exemplary embodiment, a flow chart illustrates an SDN process 400 for detecting and defending against DDoS attacks. The SDN process 400 can be a method, operated by a Software Defined Networking (SDN) controller (e.g., the SDN controller 60) associated with an Autonomous System (AS) 300 with one or more peering points 302, 304, 306, 308 each with an associated router 12 communicatively coupled to the SDN controller 60, for detecting and defending against Distributed Denial of Service (DDoS) attacks. Also, the SDN process 400 can be realized in the context of the server 200 and in one of the Autonomous Systems (AS) 300.

The SDN process 400 includes receiving data from the one or more peering points (step 410). Importantly, the data is already available to the Autonomous System (AS) 300 and can be NetFlow/Internet Protocol Flow Information Export (IPFIX) data from the routers 12. The SDN process 400 includes detecting malicious traffic at the one or more peering points (step 420). The process of detecting malicious traffic can include any techniques known in the art. Again, as described herein, BAF traffic is expected to be rare, and a sudden spike to one or more victims can be an indicator of the malicious traffic. The SDN process 400 includes determining a peer quality measurement for the one or more peering points (step 430). The peer quality measurement can incorporate all types of Bandwidth Amplification Factor (BAF) information in the DDoS attacks. Also, the peer quality measurement can incorporate all combinations to a victim or victims across Internet Protocol (IP) prefixes.

Finally, the SDN process 400 can include communicating the peer quality measurement and other data associated with the malicious traffic with other SDN controllers, associated with Autonomous Systems connected through the one or more peering points, to converge the peer quality measurement back to a nominal level (step 440). Here, the peer quality measurement is negative feedback between the Autonomous System and the Autonomous Systems connected through the one or more peering points. In an exemplary embodiment, the communicating step will be between different peering points of different Autonomous Systems until the source of the malicious traffic is identified and filtered out. The idea here is the operators of the Autonomous Systems will not want to be out of compliance with peering agreements for the peering points. The exemplary implementation is described with respect to Autonomous Systems, the SDN process 400 be applied within the individual AS. The Peer Quality is then between any two internal routers.

The other data associated with the malicious traffic can include source Internet Protocol (IP) addresses, destination IP addresses, protocol, and port number, allowing the other SDN controllers to similarly track down problems with peering points associated with the Autonomous Systems and provide feedback via the peer quality measurement and data associated with the peering points associated with the Autonomous Systems. Also, the nominal level can be based on historical monitoring through the SDN controller.

Advantageously, the SDN process 400 reuses network utilization data already tracked by Autonomous Systems. The Peer Quality calculation covers all types of BAF (DNS, NTP, SNMP etc.). The Peer Quality calculation covers all combinations of BAF to a victim or victims across IP prefixes. For example, when 208.80.56.11 is attacked with NTP and DNS. Another example is when 208.80.56.11 is attacked with NTP and DNS, also 208.80.57.112 is attacked with SNMP. The Peer Quality calculation is distributed. The Peer Quality allows for average utilization to vary, as long as the difference is not caused by BAF. The Peer Quality data with its associated malicious traffic information allows Autonomous System the flexibility to set the level of filtering. In the exemplary implementation, the data includes the source IP addresses (the reflectors e.g. NTP servers), the destination IP (victim—whose IP address was spoofed), the protocol UDP, port number 123. The distributed and iterative systems and methods used herein has been shown to converge the Peer Quality Measurement to a nominal level because peering agreements have costs associated with excess bandwidth. That is, Peer Quality can converge back to 1 or some other nominal value based on a feedback loop with negative and/or positive feedback to combat BAF and DDoS.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, operated by a Software Defined Networking (SDN) controller associated with an Autonomous System (AS) comprising one or more peering points, each peering point comprising an associated router communicatively coupled to the SDN controller, the method for detecting and defending against Distributed Denial of Service (DDoS) attacks, and the method comprising:
   receiving data from the one or more peering points;
   detecting malicious traffic at the one or more peering points;
   determining a peer quality measurement for the one or more peering points, wherein the peer quality measurement is based on a summation of average traffic plus detected malicious traffic divided by a summation of average traffic, wherein the average traffic and the malicious traffic are across all of the one or more eering points between the Autonomous System and other Autonomous Systems, wherein the peer quality measurement incorporates all types of Bandwidth Amplification Factor (BAF) information in the DDoS attacks, and wherein the malicious traffic is detected based on addresses detected through the SDN controller;
   communicating the peer quality measurement associated with the malicious traffic to one or more other SDN controllers associated with the other Autonomous Systems connected through the one or more peering points, wherein a feedback loop with feedback between the Autonomous System and the other Autonomous Systems is utilized to converge the peer quality measurement back to a nominal level based on historical monitoring for the average traffic between the Autonomous System and the other Autonomous Systems through the SDN controller; and
   recalculating the peer quality measurement for the one or more peering points subsequent to the feedback loop and continuing communicating the recalculated peer quality measurement until the peer quality measurement is back to the nominal level.

2. The method of claim 1, wherein the data from the one or more peering points is NetFlow, Internet Protocol Flow Information Export (IPFIX), sFlow, or OpenFlow data.

3. The method of claim 1, wherein the peer quality measurement incorporates data from all connections to a victim or victims across Internet Protocol (IP) prefixes.

4. The method of claim 1, wherein the other data associated with the malicious traffic includes source Internet Protocol (IP) addresses, destination IP addresses, protocol, and port number, allowing the one or more other SDN controllers to similarly track down problems with peering points associated with the Autonomous Systems and provide feedback via the peer quality measurement and data associated with the peering points associated with the Autonomous Systems.

5. A Software Defined Networking (SDN) controller, associated with an Autonomous System comprising one or more peering points, each peering point comprising an associated router communicatively coupled to the SDN controller, the SDN controller configured to detect and defend against Distributed Denial of Service (DDoS) attacks, the SDN controller comprising:
   a network interface communicatively coupled to routers associated with the one or more peering points;

a processor communicatively coupled to the network interface; and memory storing instructions that, when executed, cause the processor to receive data from the routers associated with the one or more peering points, detect malicious traffic at the routers associated with the one or more peering points, determine a peer quality measurement for the routers associated with the one or more peering points, wherein the peer quality measurement is based on a summation of average traffic plus detected malicious traffic divided by a summation of average traffic, wherein the average traffic and the malicious traffic are across all of the one or more peering points between the Autonomous System and other Autonomous Systems, wherein the peer quality measurement incorporates all types of Bandwidth Amplification Factor (BAF) information in the DDoS attacks, and wherein the malicious traffic is detected based on addresses detected through the SDN controller, communicate the peer quality measurement associated with the malicious traffic to one or more other SDN controllers associated with the other Autonomous Systems connected through the routers associated with the one or more peering points, wherein a feedback loop with feedback between the Autonomous System and the other Autonomous Systems is utilized to converge the peer quality measurement back to a nominal level based on historical monitoring for the average traffic between the Autonomous System and the other Autonomous Systems through the SDN controller, and recalculate the peer quality measurement for the one or more peering points subsequent to the feedback loop and continue communication of the recalculated peer quality measurement until the peer quality measurement is back to the nominal level.

6. The SDN controller of claim 5, wherein the data from the routers associated with the one or more peering points is NetFlow, Internet Protocol Flow Information Export (IPFIX), sFlow, or OpenFlow data.

7. The SDN controller of claim 5, wherein the peer quality measurement incorporates data from all connections to a victim or victims across Internet Protocol (IP) prefixes.

8. The SDN controller of claim 5, wherein the other data associated with the malicious traffic includes source Internet Protocol (IP) addresses, destination IP addresses, protocol, and port number, allowing the one or more other SDN controllers to similarly track down problems with peering points associated with the Autonomous Systems and provide feedback via the peer quality measurement and data associated with the peering points associated with the Autonomous Systems.

9. An Autonomous System (AS) configured to detect and defend against Distributed Denial of Service (DDoS) attacks, the AS comprising:

one or more routers each associated with one or more peering points with other Autonomous Systems; and a Software Defined Networking (SDN) controller communicatively coupled to the one or more routers, the SDN controller configured to receive data from the one or more routers associated with the one or more peering points, detect malicious traffic at the one or more routers, determine a peer quality measurement for the one or more routers associated with the one or more peering point, wherein the peer quality measurement is based on a summation of average traffic plus detected malicious traffic divided by a summation of average traffic, wherein the average traffic and the malicious traffic are across all of the one or more peering points between the Autonomous System and the other Autonomous Systems, wherein the peer quality measurement incorporates all types of Bandwidth Amplification Factor (BAF) information in the DDoS attacks, and wherein the malicious traffic is detected based on addresses detected through the SDN controller, communicate the peer quality measurement associated with the malicious traffic to one or more other SDN controllers associated with the other Autonomous Systems connected through the one or more routers, wherein a feedback loop with feedback between the Autonomous System and the other Autonomous Systems is utilized to converge the peer quality measurement back to a nominal level based on historical monitoring for the average traffic between the Autonomous System and the other Autonomous Systems through the SDN controller, and recalculate the peer quality measurement for the one or more peering points subsequent to the feedback loop and continue communication of the recalculated peer quality measurement until the peer quality measurement is back to the nominal level.

10. The Autonomous System of claim 9, wherein the data from the one or more routers is NetFlow, Internet Protocol Flow Information Export (IPFIX), sFlow, or OpenFlow data.

11. The Autonomous System of claim 9, wherein the peer quality measurement incorporates data from all connections to a victim or victims across Internet Protocol (IP) prefixes in the Autonomous System.

12. The Autonomous System of claim 9, wherein the other data associated with the malicious traffic includes source Internet Protocol (IP) addresses, destination IP addresses, protocol, and port number, allowing the one or more other SDN controllers to similarly track down problems with peering points associated with the other Autonomous Systems and provide feedback via the peer quality measurement and data associated with the peering points associated with the other Autonomous Systems.

\* \* \* \* \*